No. 687,216. Patented Nov. 26, 1901.
J. FOREMAN.
BICYCLE.
(Application filed Mar. 7, 1901.)

(No Model.)

Witnesses  
Inventor  
Joseph Foreman.  
by John H. Hendry  
his Attorney

THE NORRIS PETERS CO., PHOTO-LITHO., WASHINGTON, D. C.

UNITED STATES PATENT OFFICE.

JOSEPH FOREMAN, OF HAMILTON, CANADA.

BICYCLE.

SPECIFICATION forming part of Letters Patent No. 687,216, dated November 26, 1901.

Application filed March 7, 1901. Serial No. 50,217. (No model.)

*To all whom it may concern:*

Be it known that I, JOSEPH FOREMAN, a citizen of Canada, residing at Hamilton, in the county of Wentworth and Province of Ontario, Canada, have invented certain new and useful Improvements in Bicycles; and I do hereby declare the following to be a full, clear, and exact description of the invention, such as will enable others skilled in the art to which it appertains to make and use the same.

My invention relates to improvements in bicycles in which a spring-frame is so arranged and devised that parts of the tubular frame is hinged and capable of telescoping or sliding in or onto its own tube, which is on the same line, when mounted or when weight or pressure is brought to bear on the seat, handles, and the pedals.

The objects of my invention are, first, to provide a bicycle-frame that is capable of an easy and natural spring motion by its own inherent resiliency when mounted and more especially when passing over uneven ground; second, to provide means for preventing any undue strain and torsion to the frame, and, third, to afford facilities for producing a non-rigid frame, and therefore comfort and ease when riding. I attain these objects by the mechanism illustrated in the accompanying drawings, in which—

Figure 1:
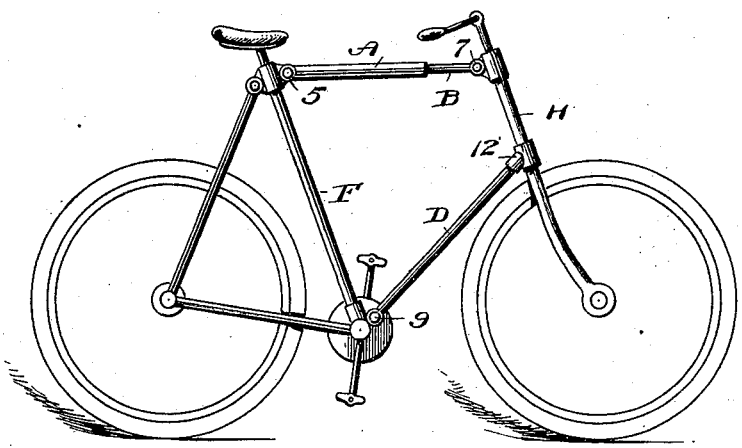
Figure 2:
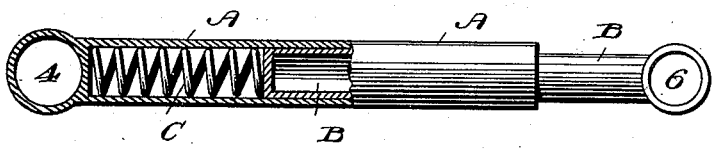

Figure 1 is a side elevation of a bicycle equipped with my improvements; and Fig. 2, a longitudinal section of the telescopic joint in the frame, showing the spring and certain parts in full lines.

Similar characters refer to similar parts throughout both views.

The description of my improvements in a bicycle-frame is as follows: In the drawings the upper horizontal rail or brace part of the frame of the bicycle comprises the tube A, an inner bar or tube B, and a spiral spring C inside of the tube A and in contact with the closed and hinged end of the tube A and the inclosed end of the tube or bar B. The left-hand end of the upper tube A has a transverse eye 4 to hinge to the upper part of the seat-post F of the bicycle-frame, as at 5, and the tube B has a transverse eye 6 to hinge, as at 7, to the upper part of the handle-post H of the bicycle-frame. The lower end of the oblique tube D has a transverse eye 8 to hinge to the lower part of the seat-post F of the frame, as at 9, and the upper end of the tube D is rigidly connected to a lower part of the handle-post H, as at 12. The hinges 5, 7, and 9 are a necessity to the proper working of the frame in order to allow the whole of the frame to possess inherent resiliency when the bicycle is mounted. At this time the end of the tube B bears against the end of the spiral spring C and compresses the same. Therefore the spring gives and allows certain resiliency to the frame, it being obvious that the greater the weight acting upon either the seat, handles, or pedals or a part the whole thereof the greater will be the compression on the ends of the spring C. The nature of this spring C is to extend in length to allow of compression in order to afford resiliency to the frame of the bicycle.

Various changes in the form, proportion, and minor details of this invention may be resorted to without departing from the spirit and scope thereof. Hence

What I claim as my invention, and desire to secure by Letters Patent, is—

In a bicycle-frame, the combination of a seat-post; a head-post; an upper reach-bar consisting of telescopic front and rear sections, the rear section having an open end and a closed end, the closed end being hinged to the upper part of the seat-post; a spiral spring located in the rear section in contact with the closed end thereof; the front section being of smaller diameter than the rear section and capable of sliding therein, said front section having its forward end hinged to the upper part of the head-post, and its other end resting against the spiral spring in the rear section; a lower reach-bar having its rear end hinged to the lower part of the seat-post, and its front end rigidly connected to the lower part of the head-post, substantially as described and set forth.

In testimony whereof I affix my signature in presence of two witnesses.

JOSEPH FOREMAN.

Witnesses:
JOHN H. HENDRY,
B. E. HERALD.